United States Patent [19]

Andenmatten et al.

[11] Patent Number: 5,511,575
[45] Date of Patent: Apr. 30, 1996

[54] APPARATUS FOR PERMITTING UNINTERRUPTED RELIEF OF CARGO TANK COMPARTMENT INTERNAL PRESSURE AND PREVENTING LEAKAGE OF LADING FROM THE CARGO TANK DURING DYNAMIC PRESSURE SURGES

[76] Inventors: Roy W. Andenmatten, 10 Eva La., Farmingville, N.Y. 11738; Ronald P. Andenmatten, 27 Otsego Ave., Dix Hills, N.Y. 11746

[21] Appl. No.: 348,380

[22] Filed: Dec. 1, 1994

[51] Int. Cl.$^6$ ................................................. F16K 17/04
[52] U.S. Cl. ..................... 137/43; 137/202; 137/512; 137/523; 137/587; 137/614.2; 220/203.27; 220/745; 251/83
[58] Field of Search ........................... 137/43, 202, 512, 137/512.3, 523, 587, 614.2; 220/203.27, 745; 251/83

[56] References Cited

U.S. PATENT DOCUMENTS

| | | |
|---|---|---|
| 1,405,525 | 2/1922 | Le Cain .................................. 137/512 |
| 1,960,970 | 5/1934 | Fina ..................................... 137/512.3 |
| 2,133,200 | 10/1938 | Kenneweg . |
| 2,159,178 | 5/1939 | Rike et al. . |
| 2,404,924 | 7/1946 | Sacchini . |
| 3,568,695 | 3/1971 | DeFrees . |
| 3,650,293 | 3/1972 | Kutz et al. . |
| 5,048,553 | 9/1991 | VanDeVyvere . |
| 5,135,024 | 8/1992 | LaBlanc et al. . |
| 5,148,828 | 9/1992 | Farnham .............................. 137/512 X |
| 5,246,027 | 9/1993 | Morris . |

*Primary Examiner*—Robert G. Nilson
*Attorney, Agent, or Firm*—Morgan & Finnegan

[57] ABSTRACT

The invention disclosed relates to an apparatus for permitting uninterrupted relief of cargo tank compartment internal pressures while also preventing the leakage of lading from the cargo tank to the surrounding atmosphere during sudden increases in the cargo tank internal pressure. According to one embodiment of the present invention, the cargo tank compartment pressure relief valve comprises a flow chamber coupled to an opening in the cargo tank compartment wall, wherein the flow chamber has a first opening in flow communication with the tank compartment and a second opening in flow communication with the atmosphere, whereby the first opening is under the control of a downwardly biased first vent head and the second opening is under the control of a downwardly biased second vent head.

16 Claims, 8 Drawing Sheets

APPARATUS FOR PERMITTING UNINTERRUPTED RELIEF OF CARGO TANK COMPARTMENT INTERNAL PRESSURE AND PREVENTING LEAKAGE OF LADING FROM THE CARGO TANK DURING DYNAMIC PRESSURE SURGES

FIELD OF INVENTION

The present invention relates generally to pressure relief valves for cargo tank compartments and, more particularly, to apparatus for permitting uninterrupted relief of internal pressure from a cargo tank compartment, regardless of tank orientation, while also preventing leakage of lading from the tank compartment during pressure spikes resulting from rollover accidents or other accidents in which the tank wall may be deformed in a manner which reduces the internal tank volume.

BACKGROUND OF THE INVENTION

Hazardous or volatile liquids such as gasoline are primarily transported in cargo tanks. Typically, a cargo tank is divided into four or five separate compartments, each of which has a pressure relief system secured to its upper wall consisting of an emergency pressure relief valve and a combined vacuum relief/normal pressure relief valve. Alternatively, the combined vacuum relief/normal pressure relief valve may be replaced by separate vacuum relief and normal pressure relief valves. The normal pressure relief feature of the combined vacuum relief/normal pressure relief valve provides minimal flow capacity and functions to alleviate minor increases in the cargo tank internal pressure by venting pressurized vapors to the atmosphere. Similarly, the vacuum relief feature of the combined vacuum relief/normal pressure relief valve provides minimal flow capacity but, unlike the normal pressure relief feature, functions to alleviate minor decreases in the cargo tank internal pressure by venting atmosphere into the tank compartment. The emergency pressure relief valve operates to protect the tank compartment from rupturing or exploding due to a significant increase in the cargo tank internal pressure which could not otherwise be alleviated by the normal pressure relief valve.

Significant increases in the cargo tank internal pressure requiring emergency venting most often occur during either (1) accidents resulting in fire or substantial tank deformation or (2) cargo tank loading when the vapor recovery system fails to vent cargo vapors from the tank compartments. Under such conditions, the emergency pressure relief valve is designed to automatically open when the internal tank pressure reaches a predetermined level, or "set pressure," to relieve the excess pressure within the tank compartment by venting pressurized vapors to the atmosphere. The value of this "set pressure" varies depending upon the maximum allowable working pressure for each of the different types of cargo tanks. For example, with regard to MC 306 or DOT 406 type tanks typically used for transporting flammable liquids such as gasoline, the emergency pressure relief valve "set pressure" is approximately 3–4½ PSI.

Traffic accidents involving cargo tank vehicles transporting hazardous or volatile materials often result in the cargo tank overturning and impacting the ground (hereinafter referred to as "rollover accidents"). During such rollover accidents, a very sudden liquid surge occurs within the cargo tank compartment which causes a relatively short but extremely high dynamic pressure increase within the tank compartment (hereinafter referred to as "pressure spike"). Because such a pressure spike usually exceeds the predetermined pressure level at which conventional emergency pressure relief valves are designed to automatically open, hazardous or volatile liquids may spray or leak from the cargo tank compartment to the surrounding area thus presenting a dangerous situation. In an attempt to eliminate this dangerous situation, the United States Department of Transportation promulgated regulations which require that, as of Aug. 31, 1995, cargo tank compartments must be equipped with emergency pressure relief valves which leak no lading during such pressure spikes (commonly referred to as "zero leakage" regulations).

Presently, there is no known reliable technique to safely prevent emergency pressure relief valves from opening and leaking lading during pressure spikes resulting from rollover accidents. In response to the Department of Transportation zero leakage regulations, the industry has developed "zero leakage" emergency pressure relief valves which operate to prevent the leakage of lading during pressure spikes by momentarily closing for the duration of the pressure spike. However, because these emergency pressure relief valves are designed to remain closed during pressure spikes, the basic danger of tank rupture or explosion exists since no means is provided to relieve sudden increases in tank compartment pressures whether static or spike related. Further, because these emergency pressure relief valves are complicated in design and use dynamic pressure seals, such as O-rings, a danger exists that these valves might seize or clog, thus rendering the valve inoperable.

Moreover, because these emergency vents are further designed to open in response to excessive internal tank compartment pressures after momentarily closing for the duration of a pressure spike, a danger of lading leakage exists in the event of a rollover accident resulting in deformation of the tank compartment. It is commonly understood that the deformation of the tank walls results in a reduction of the tank volume. Moreover, since the tank compartment vapors are highly compressible relative to the liquid lading, any reduction in the tank volume results in an increase in the tank vapor pressure. For example, a tank deformation which reduces the tank compartment vapor space by one-half the original vapor space increases the tank compartment vapor static pressure by one atmosphere or 14.7 PSI. Thus, for a typical fully loaded cargo tank having a tank compartment vapor space of 3% of the total tank compartment volume, a 1.5% reduction in the tank compartment volume resulting from tank deformation increases the tank compartment vapor pressure by 14.7 PSI. Because emergency pressure relief valves on cargo tank vehicles transporting gasoline are designed to open when the internal tank pressure exceeds approximately 3–4½ PSI, an increase in the tank compartment vapor static pressure by one atmosphere (14.7 PSI) due to tank deformation will cause the emergency pressure relief valve to open. Therefore, although these "zero leakage" emergency pressure relief valves momentarily close to prevent lading from leaking during pressure spikes, in the event of a rollover accident which results in tank deformation these "zero leakage" emergency pressure relief valves may subsequently open and permit lading to leak to the surrounding area until the internal tank pressure drops below about 3–4½ PSI.

Thus, there currently exists a compelling and industry recognized need for an emergency pressure relief valve which provides a means for uninterrupted relief of excess internal cargo tank pressure and also a safe and reliable means for preventing leakage of lading, regardless of tank orientation, during pressure spikes resulting from rollover accidents or excessive internal tank compartment static pressure caused by tank deformation.

OBJECTS AND SUMMARY OF THE INVENTION

Accordingly, it is a principal object of the present invention to provide new and improved apparatus for (1) permitting uninterrupted relief of excess cargo tank internal pressure, regardless of tank orientation, and (2) preventing the leakage of lading in response to a dynamic pressure spike caused, for example, by a rollover accident.

It is a further object of the present invention to prevent the leakage of lading, regardless of tank orientation, in response to significant tank compartment internal pressure increases resulting from tank deformation.

It is also an object of the present invention to adapt the new and improved apparatus for use with a conventional cargo tank vapor recovery system to increase the containment volume for any lading which may leak from the tank compartment.

It is also an object of the present invention to adapt the new and improved apparatus for use as a tank compartment vapor valve.

It is also an object of the present invention to adapt the new and improved apparatus to operate in conjunction with the compartment valve to permit positive vapor venting of the tank compartment during the loading and unloading procedures.

Objects and advantages of the invention are set forth in part above and in part below. In addition, these and other objects and advantages of the invention will become apparent herefrom, or may be appreciated by practice with the invention, the same being realized and attained by means of instrumentalities, combinations, and methods pointed out in the appended claims. Accordingly, the present invention resides in the novel parts, constructions, arrangements, improvements, methods and steps herein shown and described.

DETAILED DESCRIPTION OF PREFERRED EMBODIMENTS

Referring generally to the embodiments of the invention shown in the accompanying drawings, wherein like reference numbers refer to like parts throughout the various views, the basic principles of the broadest aspect of the invention can be appreciated from FIGS. 1– 4.

Figure 1:
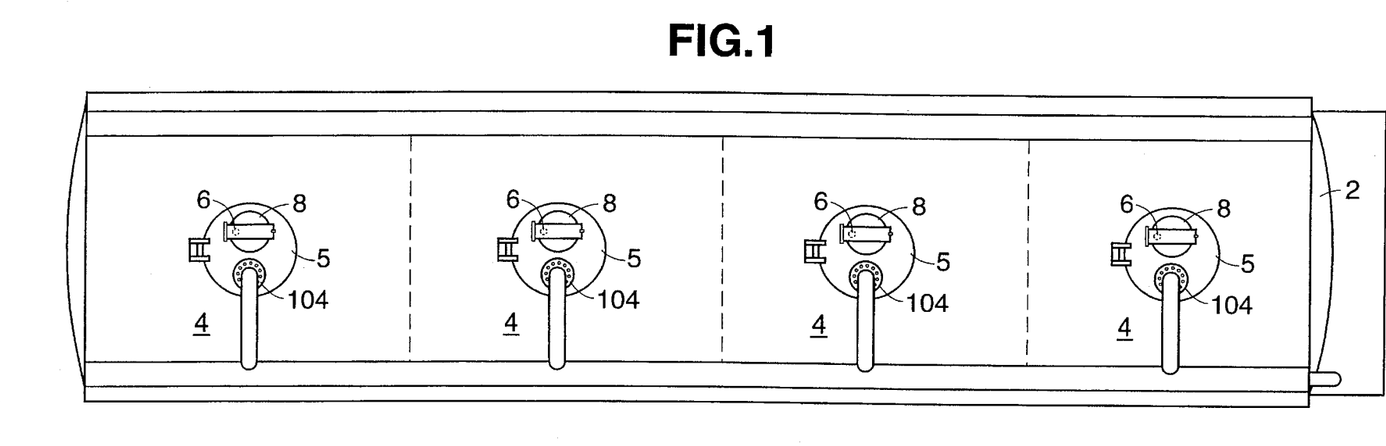
FIG. 1 is a top plan view of a cargo tank to which this invention may be applied.

As shown in FIG. 1, a cargo tank 2 includes a plurality of tank compartments 4, each of which is an individual tank suitable for carrying liquid material. Typically located at the top portion of each tank compartment 4 is a manhole cover plate 5 upon which the following are mounted: a combined vacuum relief/normal pressure relief valve 6, an emergency pressure relief valve, designated generally by 8, and a vapor valve 104 coupled in flow communication to a vapor recovery system.

Figure 2:
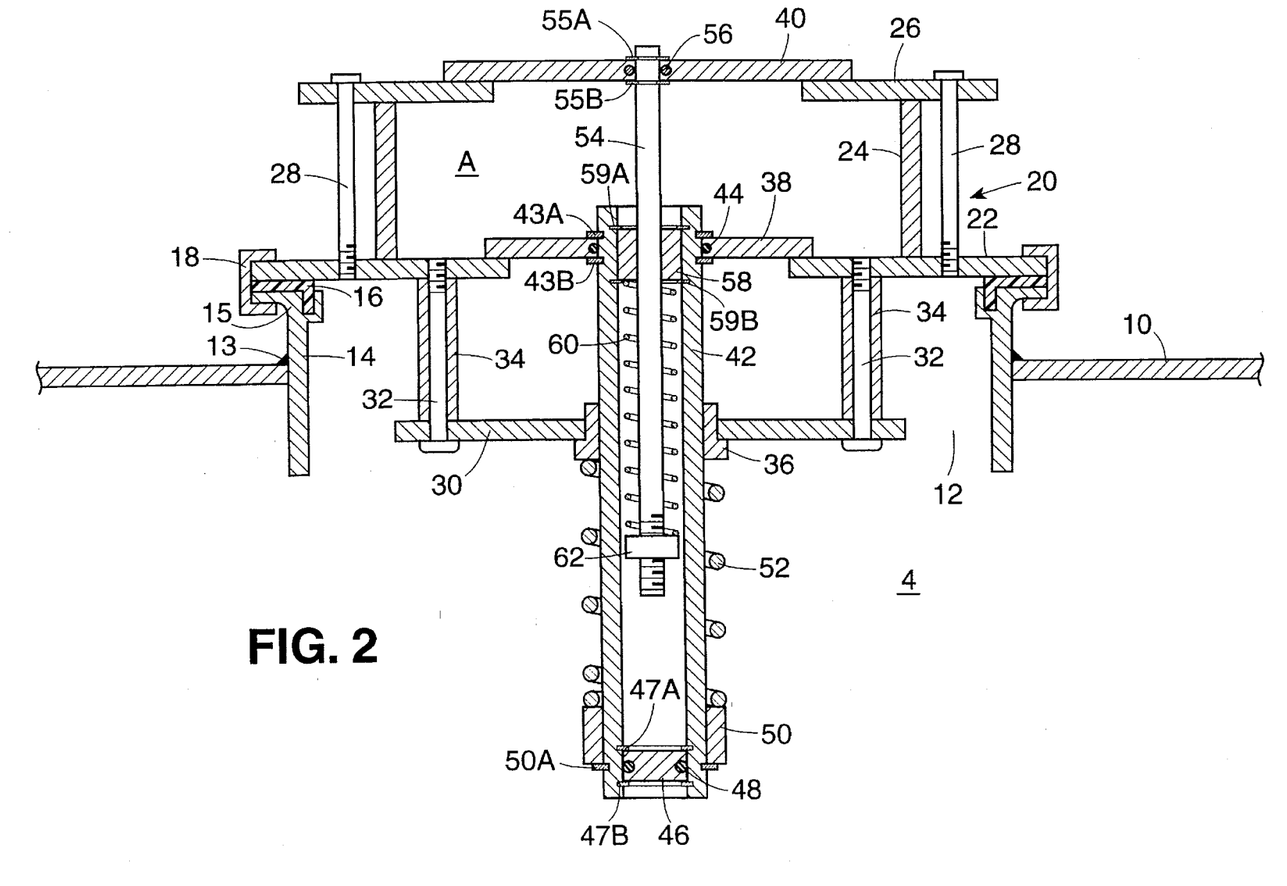
FIG. 2 is a vertical sectional view of one embodiment of the present invention wherein the primary and secondary vent heads are in their normally closed positions.

Referring now to FIG. 2, each tank compartment 4 has a top wall 10 that is provided with an opening 12. As shown in FIG. 2, one embodiment of the emergency pressure relief valve according to the present invention includes a housing, designated generally by 20, having an annular valve flange 22, a hollow cylindrical chamber tube 24, an annular top chamber plate 26, and an annular spring mounting plate 30. Annular valve flange 22 is coupled to the outside surface of tank wall 10 such that it is centrally disposed over opening 12. Preferably, annular valve flange 22 is coupled to tank wall 10 by means of a weld ring. To this end, weld ring 14 is inserted within opening 12 and connected about its periphery to tank wall 10, such as by welds 13. The exterior end of weld ring 14 includes a flanged lip 15 which mates with annular valve flange 22 with a sealing gasket 16 therebetween. The flanged lip 15 and annular valve flange 22 are secured together by a clamp ring 18 which is tightened with screws. Hollow cylindrical chamber tube 24 is centrally disposed at its bottom surface with respect to annular valve flange 22 and at its top surface with respect to annular top chamber plate 26 such that it functions as a "spacer" between valve flange 22 and chamber plate 26. Top chamber plate 26 is positioned on the top surface of chamber tube 24 and is mounted to annular valve flange 22 by a plurality of bolts 28.

As further shown in FIG. 2, annular spring mounting plate 30 is similarly mounted to the bottom surface of annular valve flange 22 by a plurality of bolt and spacer assemblies, each of which includes a bolt 32 encased by a spacer 34 whereby the spacer abuts the bottom surface of annular valve flange 22 at one end and the top surface of annular spring mounting plate 30 at its other end such that annular spring mounting plate 30 is fixedly positioned at a distance defined by the length of spacer 34 below annular valve flange 22. In addition, hollow cylindrical bushing 36 is fixedly mounted within the aperture of spring mounting plate 30.

It will also be understood that the above described components comprising housing 20 may alternatively be manufactured, for example, as a single casted unit.

Figure 3:
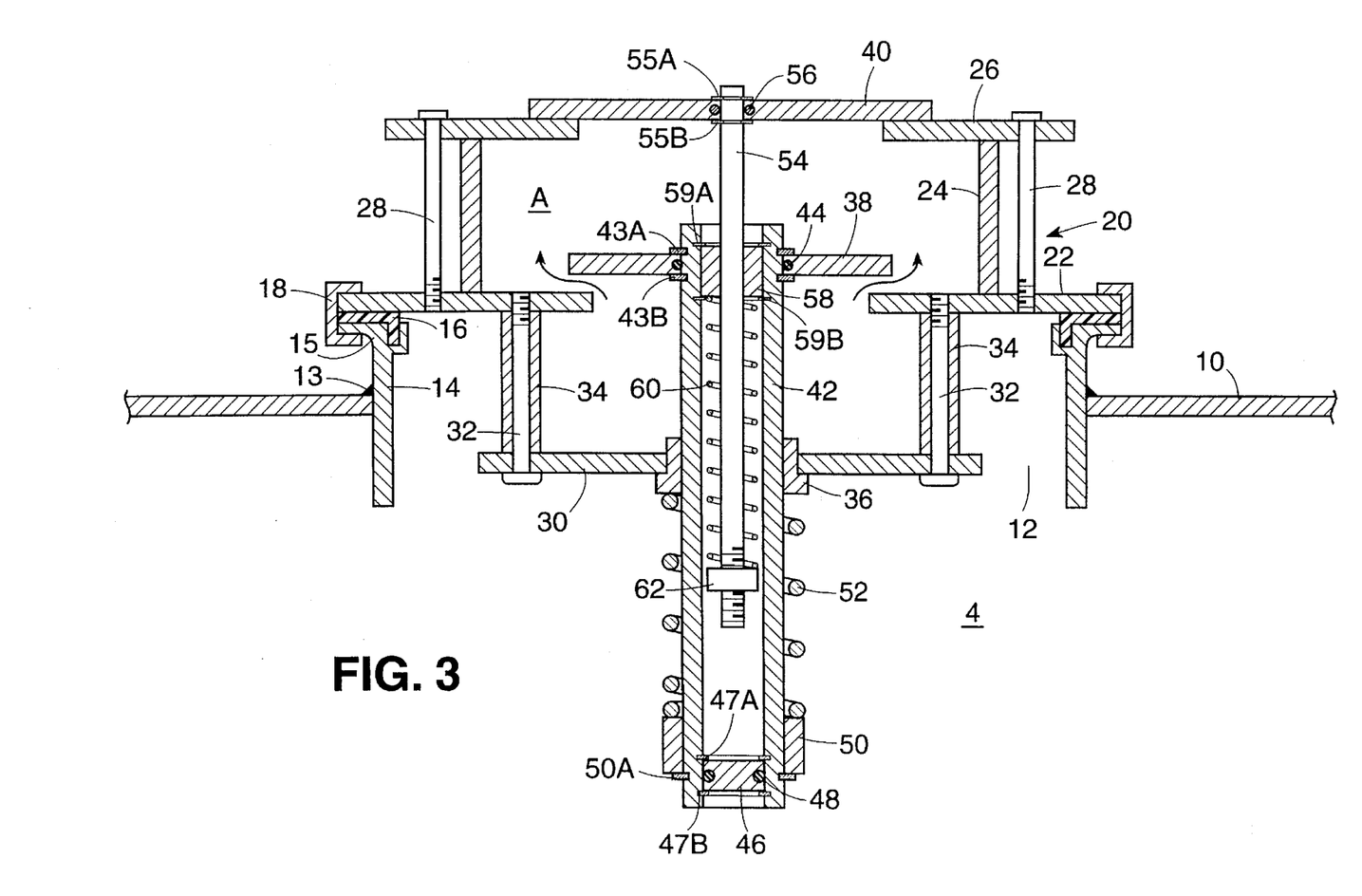
FIG. 3 is a vertical sectional view according to the embodiment of FIG. 2 wherein the primary vent head is in an open position and the secondary vent head is in its normally closed position.
Figure 4:
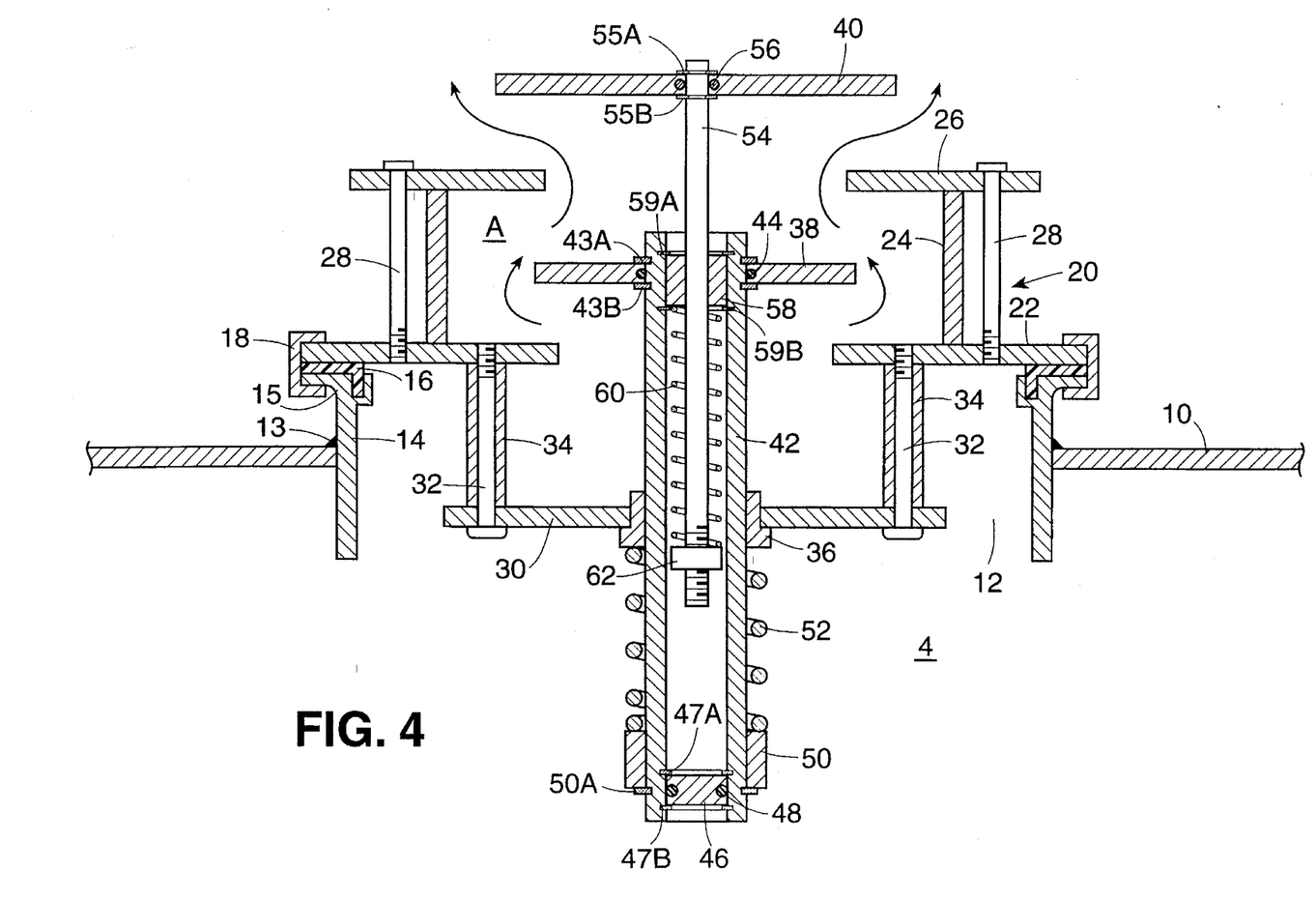
FIG. 4 is a vertical sectional view according to the embodiment of FIG. 2 wherein both the primary and secondary vent heads are in open positions.

With particular reference to FIGS. 2–4, it will be seen that the upper portion of housing 20 comprises a hollow chamber, generally designated as A, wherein the aperture of annular valve flange 22 defines a venting inlet under the control of primary vent head 38 and the aperture of annular top chamber plate 26 defines a venting outlet under the control of secondary vent head 40. Primary vent head 38 is movable between the closed position illustrated in FIG. 2 and the open position illustrated in FIG. 3. Similarly, secondary vent head 40 is movable between the closed position illustrated in FIG. 2 and the open position illustrated in FIG. 4.

As described with reference to FIG. 2, primary vent head 38 has a centrally disposed aperture through which the top portion of hollow cylindrical tube 42 is fixedly attached by means of snap-rings 43A and 43B. In addition, an air-tight seal is provided between primary vent head 38 and cylindrical tube 42 by means of O-ring 44. The cylindrical tube 42 extends downwardly into tank 4 and is slidably mounted at generally its middle portion within bushing 36. The bottom end of cylindrical tube 42 is closed by shaft plug 46 which is fixedly mounted inside cylindrical tube 42 by means of snap-rings 47A and 47B and sealingly attached by means of O-ring 48. In addition, a hollow cylindrical spring spacer 50 is fixedly attached around the outer surface of the lower portion of cylindrical tube 42 by means of a snap-ring 50A. As further shown in FIG. 2, a first helical compression spring 52 encircles cylindrical tube 42 and is positioned such that its lower end abuts the top surface of spring spacer 50 and its upper end abuts the bottom surface of bushing 36 to yieldably bias the primary vent head 38 downwardly toward its closed position. It will be understood that the downward biasing force on primary vent head 38 can be varied by either increasing or decreasing the steady-state compression force of first spring 52 through changing the height of spring spacer 50 on cylindrical tube 42.

Alternatively, spring spacer 50 can be in the form of an adjustable spring spacer, such as a threaded collar or seat nut. Accordingly, the outside surface of the lower portion of cylindrical tube 42 will have a machine thread such that it may receive the threaded collar or seat nut. It will be understood that with this form of an adjustable spring spacer 50 the downward biasing force on primary vent head 38 can be varied by either increasing or decreasing the steady-state compression force of first spring 52 through adjusting the position of adjustable spring spacer 50 on cylindrical tube 42.

The secondary vent head 40 has a centrally disposed aperture through which the top portion of shaft 54 is fixedly mounted by means of snap-rings 55A and 55B and sealingly attached by means of O-ring 56. Shaft 54 extends downwardly inside cylindrical tube 42 and is slidably mounted at generally its middle portion within bushing 58, which, in turn, is fixedly mounted inside the top portion of cylindrical tube 42 by means of snap-rings 59A and 59B. At its lower portion, shaft 54 includes an adjustable spring seat 62, which may comprise, for example, a conventional nut and washer assembly. A second helical compression spring 60 encircles shaft 54 and is positioned such that its lower end abuts the top surface of spring seat 62 and its upper end abuts the bottom surface of bushing 58 to yieldably bias the secondary vent head 40 downwardly toward its closed position as shown in FIG. 2. It will be understood that the downward biasing force on secondary vent head 40 can be varied by either increasing or decreasing the steady-state compression force of second spring 60 through adjusting the position of the spring nut and washer assembly 62 on shaft 54.

In addition, housing 20 may have a normally plugged, National Pipe Thread ("NPT") hole for use in pressure testing located at, for example, the general region corresponding to annular top chamber plate 26.

In operation, as illustrated in FIG. 2, primary vent head 38 and secondary vent head 40 are retained in their normally closed positions, seated firmly against the upper surfaces of annular valve flange 22 and chamber plate 26, respectively. This is due to the fact that, unless the pressure within tank compartment 4 and chamber A exceed certain predetermined levels, the net retaining forces exerted by first spring 52 and second spring 60 exceed the forces exerted against the bottom surfaces of primary vent head 38 and secondary vent head 40, respectively. When the pressure within the tank compartment 4 increases and exceeds the net counteracting biasing force exerted by first spring 52 and spring 60, primary vent head 38 will open, as illustrated in FIG. 3, and allow vapors to "bleed" into chamber A. As vapors continue to "bleed" into chamber A from tank compartment 4, the pressure with chamber A increases. This increased pressure within chamber A has the dual effect of simultaneously acting to apply an additional closing force on primary vent head 38 and to apply an increased force tending to open secondary vent head 40. Thus, to the extent the increased pressure within chamber A is less than the downwardly biasing force exerted by second spring 60, secondary vent head 40 will remain closed and the closing force on primary vent head 38 will gradually increase as more highly pressurized vapors "bleed" into chamber A. However, when the pressure within chamber A exceeds the downwardly biasing force exerted by second spring 60, secondary vent head 40 will open, as illustrated in FIG. 4, and allow pressurized vapors within chamber A to vent to the atmosphere. This venting of vapors to the atmosphere from chamber A results in a decompression of chamber A, which in turn decreases the additional closing force exerted on primary vent head 38. If the force exerted by the pressurized vapors within tank compartment 4 exceeds the closing force on primary vent head 38, primary vent head 38 will remain open and allow vapor to "bleed" from the tank compartment 4 and into chamber A. Venting of the pressurized vapors within the tank continues in this manner until sufficient venting has occurred such that the force exerted on the bottom surfaces of primary vent head 38 and secondary vent head 40 are lower than their downwardly biasing closing forces, thus permitting primary vent head 38 and secondary vent head 40 to close and seal tank compartment 4.

In the event of a rollover accident, a pressure spike will be exerted against primary vent head 38 as a result of the sudden liquid surge within the tank compartment. Because this pressure spike typically exceeds the closing force on primary vent head primary vent head will open and permit lading and vapors to flow from the tank compartment into chamber A. However, because the pressure spike resulting from the liquid surge exists for only an extremely short duration, primary vent head 38 will only remain open and permit lading to flow into chamber A for a momentary period of time.

According to the present invention, chamber A has a design volume sufficient to accommodate the maximum amount of lading which may be discharged from the tank compartment during a pressure spike, such that all of the discharged lading will be contained within chamber A. Further, it will be understood that when primary vent head 38 opens in response to the pressure spike the vapor present in chamber A acts as a buffer which tends to absorb the impact of any discharged lading such that the pressure within chamber A remains at a level below the closing force exerted on secondary vent head 40. Thus, secondary vent head will remain closed during the rollover accident and any discharged lading will be contained within chamber A. Moreover, because the primary vent head opens to permit lading to flow into chamber A in response to the pressure spike, excess internal pressure within tank compartment 4 may be reduced, thereby decreasing the risk of cargo tank explosion or rupture.

Figure 5:
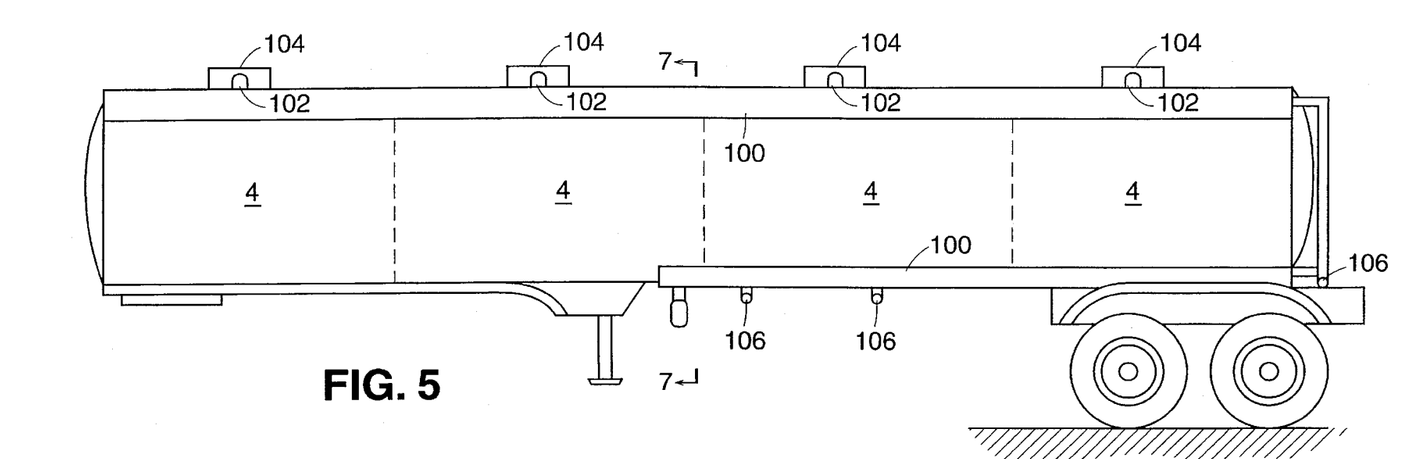
FIG. 5 is an elevation view of a cargo tank equipped with a conventional cargo tank vapor recovery system.

In an alternative form of the present invention, chamber A is coupled in flow communication with the existing cargo tank vapor recovery system in order to increase the containment volume for any lading which may leak from tank compartment 4. As shown in FIG. 5, a conventional cargo tank vapor recovery system typically comprises a vapor recovery conduit 100 coupled through a plurality of branch conduits 102 to tank compartment vapor valves 104 positioned on the top side of each tank compartment 4. Under normal operation when the tank compartments 4 are being loaded, the vapor recovery system functions to permit the flow of vapors from each tank compartment 4 to a separate vapor recovery system located at the loading facility. To this end, vapor recovery conduit 100 is coupled at outlet 106 with the vapor recovery system located at the loading facility by means of a vapor recovery adaptor. Next, the tank compartment vapor valves 104 are opened such that any displaced vapors vent from the tank compartments 4, through branch conduits 102 and vapor recovery conduit 100, and into the vapor recovery system located at the loading facility. After the tank compartments have been loaded, tank compartment vapor valves 104 are closed. Finally, the vapor recovery adaptor located at outlet 106 is disconnected from the loading facility vapor recovery system. Preferably, each vapor recovery adaptor includes an automatic self-closing poppet which acts to sealingly close outlet 106 after the loading procedure has been completed.

It will be understood that since the cargo tank vapor recovery system comprises a closed system, it may be coupled in flow communication with chamber A to greatly add to the containment volume of the present invention. Such added containment volume is particularly significant with regard to rollover accidents which result in tank compartment deformation. It is commonly understood that when tank deformation occurs, the tank compartment volume is reduced. Further, since the tank compartment vapors are highly compressible relative to the liquid lading, any reduction in the tank compartment volume will reduce the vapor space and thereby increase the vapor pressure. Furthermore, to the extent that the tank deformation causes a reduction of tank compartment volume which results in an internal tank compartment static pressure greater than the emergency vent "set pressure," the vent will open and release lading to the surrounding area. Thus, depending on the severity of deformation and the extent to which the tank compartment is filled with lading, a significant amount of lading may be released from the tank compartment during a rollover accident involving tank deformation.

While chamber A may be of sufficient volume to accommodate the maximum amount of lading which may leak from the tank compartment during a pressure spike, it may not provide sufficient volume to contain the amount of lading which may leak from the tank compartment under conditions of tank deformation. Thus, to the extent that the cargo tank vapor recovery system adds to the containment volume of the present invention, significant amounts of lading, which might otherwise leak from the tank compartment to the surrounding areas due to tank deformation, remain contained within the cargo tank's closed vapor recovery system.

Figure 6:
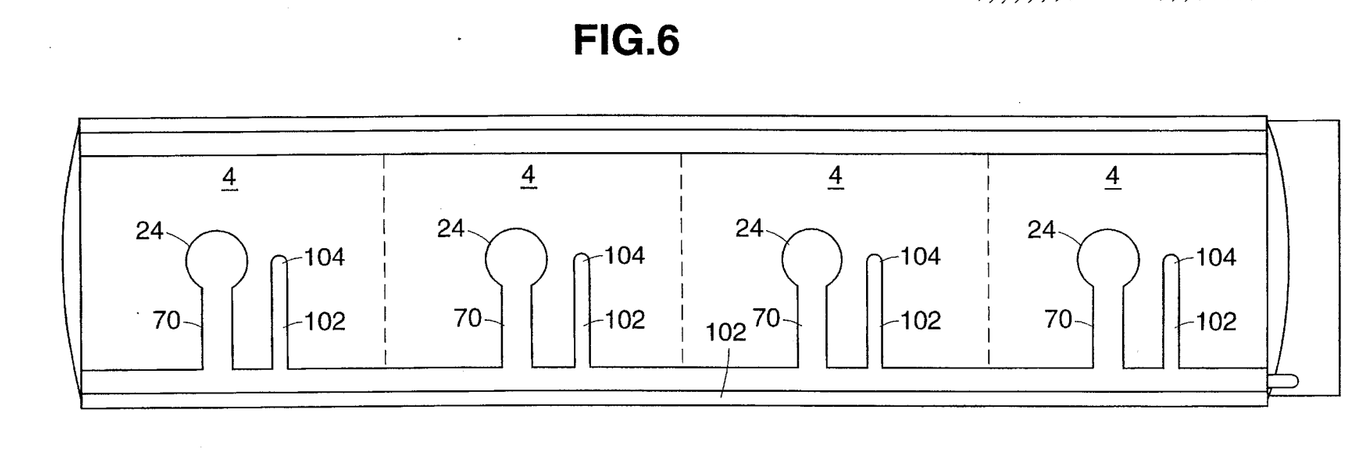
FIG. 6 is a top plan view of a cargo tank according to an alternative embodiment of the present invention which incorporates a conventional cargo tank vapor recovery system.

According to one embodiment of this alternative form of the invention, as illustrated in FIG. 6, the cargo tank vapor recovery system is coupled in flow communication with chamber A by a conduit 70 which is coupled at an inlet end to chamber tube 24 and at an outlet end to vapor recovery conduit 100.

Figure 7:
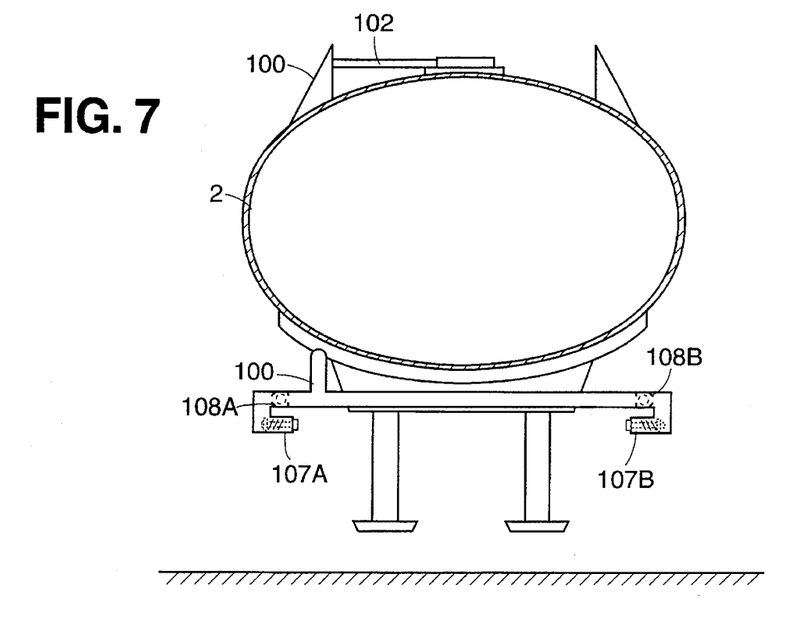
FIG. 7 is a vertical sectional view of a cargo tank in its upright position taken along the line 7—7 of FIG. 5 according to the alternative embodiment shown in FIG. 6.

As shown in FIG. 7, in order to obtain the maximum available amount of added containment volume provided by the cargo tank vapor recovery system, vapor recovery conduit 100 is equipped with two gravity assisted pressure relief valves 107A and 107B, each of which is positioned on vapor recovery conduit 100 at opposite sides of the cargo tank bottom portion. These pressure relief valves are designed to vent vapor from the vapor recovery system during a rollover accident such that the maximum amount of containment volume will be available in the vapor recovery system to hold any lading which may leak from the tank compartments. To this end, pressure relief valves 107A and 107B are located on vapor recover conduit 100 at positions generally furthest from the point at which vapor recovery conduit 100 is coupled in flow communication with chamber A.

Figure 8:
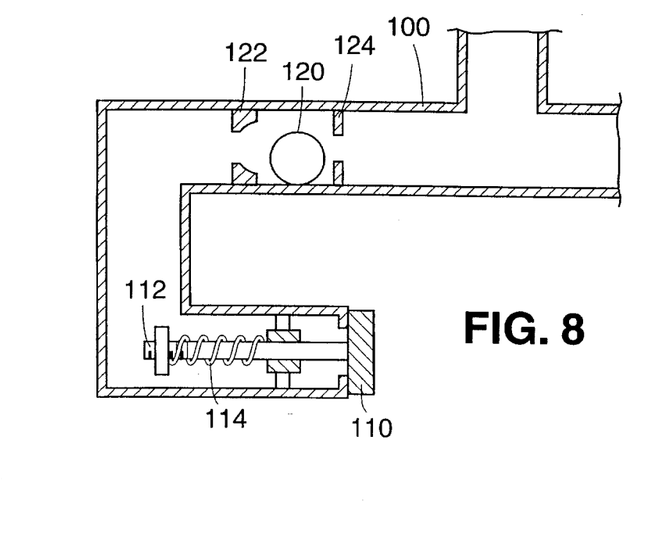
FIG. 8 is a vertical sectional view of the gravity assisted pressure relief valve and floatation shutoff device shown in FIG. 7.

Referring to FIG. 8, gravity assisted pressure relief valves 107A and 107B preferably comprise a weighted vent head 110, a stem 112, and a spring means 114. As shown in FIG. 7, these valves are in a normally horizontal position when the cargo tank is in an upright position. It will be understood that when valves 107A and 107B are in the horizontal position, weighted vent head 110 has minimal effect on the closing force of the valves. Rather, essentially the entire closing force on valves 107A and 107B will result from the force exerted by spring means 114. Further, according to the present invention, the "set pressure" for each of these valves while in the horizontal position is greater than the "set pressure" on secondary vent head 40 such that, when the cargo tank is in an upright position, tank compartment vapors will normally be externally vented through secondary vent head 40 instead of through valves 107A or 107B.

Figure 7A:
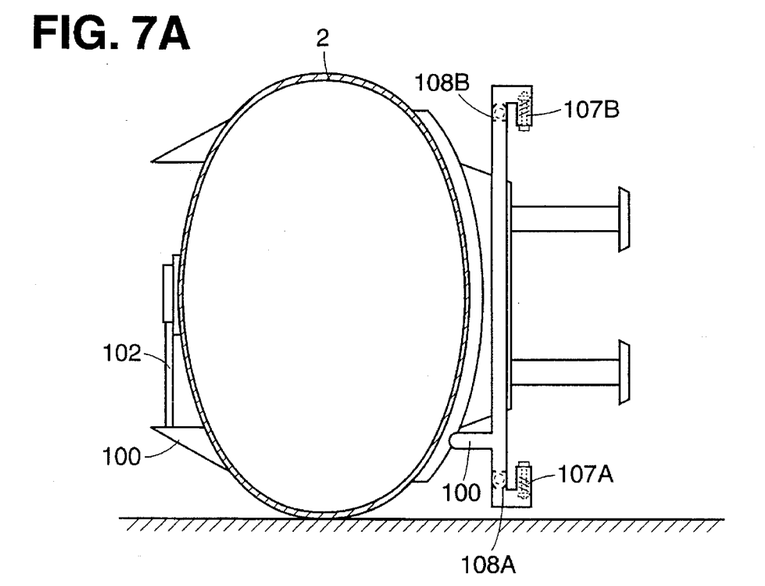
FIG. 7A is a vertical sectional view of a cargo tank in a rollover position such that it is resting on its side taken along line 7—7 of FIG. 5 according to the alternative embodiment shown in FIG. 6.

Referring now to FIG. 7A, when the cargo tank is in a rollover position such that it is resting on its side, gravity assisted pressure relief valves 107A and 107B will be in a generally vertical position. It will be understood that when these valves are in a generally vertical position, the closing force on each valve will be the net resultant of the gravitational force on vent head 110 and the force of spring means 114. Thus, depending on the orientation of the cargo tank the closing force on each valve will be either greater than or less than the valve closing force while in the horizontal position. For example, with regard to valve 107A as shown in FIG. 7A, the net resultant closing force will be increased since the gravitational force on weighted vent head 110 acts in the same direction as the closing force exerted by spring means 114. However, with regard to valve 107B as shown in FIG. 7A, the net resultant closing force will be decreased since the gravitational force on weighted vent head 110 acts opposite the closing force exerted by spring means 114. Moreover, according to the present invention, the closing force of spring means 114 and the mass of weighted vent head 110 are selected such that the resultant closing force on valve 107B while in a vertical position will be less than the closing force on secondary vent head 40 such that pressurized vapors within the vapor recovery system will be vented to the atmosphere through valve 107B in order to provide the maximum available containment capacity within the vapor recovery system to accommodate lading which may leak from the tank compartments 4.

Preferably, gravity assisted pressure relief valves 107A and 107B further include floatation shutoff devices 108A and 108B, respectively, which are designed to block the flow of liquid lading within vapor recovery conduit 100 such that lading will not leak through either valve 107A or 107B. Referring now to FIG. 8, each floatation shutoff device comprises a spherical ball 120 contained within a defined section of vapor recovery conduit 100 at a position adjacent to each of the gravity assisted pressure relief valves 107A and 107B. It will be understood that the spherical ball 120 has a specific gravity less than that of the cargo tank liquid lading such that the ball will buoyantly float on the liquid lading. As further shown in FIG. 8, spherical ball 120 is contained within a section of conduit 100 as defined on one side by an annular bevelled seat 122 and on the other side by an annular restricting orifice 124.

When the cargo tank is in a rollover position and the liquid lading flows from the tank compartments 4 and into the vapor recovery conduit 100, lading may eventually fill vapor recovery conduit 100 to a level where it may soon leak through either valve 107A or 107B. Under these circumstances, the floatation shutoff devices function to block the flow of lading when spherical ball 120 is buoyantly forced by the lading such that it sealingly engages with annular bevelled seat 122.

This embodiment of the invention operates in generally the same manner described above with respect to the embodiment illustrated in FIGS. 2–4. Accordingly, primary vent head 38 and secondary vent head 40 are normally retained in their closed positions, seated firmly against the upper surfaces of valve flange 22 and chamber plate 26, respectively. When the pressure within tank compartment 4 increases and exceeds the closing force exerted by first spring 52, primary vent head 38 will open and allow vapors to "bleed" into the combined volume of chamber A and the cargo tank vapor recovery system. As vapors continue to "bleed" into the combined volume of chamber A and the cargo tank vapor recovery system, the pressure within chamber A increases. This increased pressure within chamber A has the dual effect of simultaneously acting to apply an additional closing force on primary vent head 38 and to apply an increased force tending to open secondary vent head 40. Thus, to the extent the increased pressure within chamber A is less than the downwardly biasing force exerted by second spring 60, secondary vent head 40 will remain closed and the closing force on primary vent head 38 will gradually increase as more highly pressurized vapors "bleed" into chamber A. However, when the pressure within chamber A exceeds the downwardly biasing force exerted by second spring 60, secondary vent head 40 will open and allow pressurized vapors within chamber A to vent to the atmosphere. This venting of vapors to the atmosphere from chamber A results in a decompression of chamber A, which in turn decreases the additional closing force exerted on primary vent head 38. If the force exerted by the pressurized vapors within tank compartment 4 exceeds the closing force on primary vent head 38, primary vent head 38 will remain open and allow vapor to "bleed" from the tank compartment 4 and into chamber A. Venting of the pressurized vapors within the tank continues in this manner until sufficient venting has occurred such that the force exerted on the bottom surfaces of primary vent head 38 and secondary vent head 40 are lower than their closing forces, thus permitting primary vent head 38 and secondary vent head 40 to close and seal tank compartment 4.

In the event of a rollover accident, a pressure spike will exert a force against the bottom surface of primary vent head 38 as a result of the sudden liquid surge within tank compartment 4. Since the force of this pressure spike will typically exceed the closing force on primary vent head 38, primary vent head 38 will open and permit lading to flow from the tank compartment into the combined volume of chamber A and the cargo tank vapor recovery system. Further, as this pressure spike typically subsides after an extremely short duration, primary vent head 38 will only remain open in response to the pressure spike and permit lading to leak from the tank compartment for a short period of time. However, in the event that the rollover accident also results in tank deformation, primary vent head 38 may remain open after the pressure spike has subsided due to an increased static vapor pressure in the tank compartment resulting from the decreased tank compartment volume. Under these conditions, primary vent head 38 will remain open and permit lading to flow from tank compartment 4 into the combined volume of chamber A and the cargo tank vapor recovery system until the internal tank compartment static pressure drops below the pressure setting of primary vent head 38.

According to another feature of the present invention, the embodiment described above with reference to FIG. 6 may also be adapted to function as a tank compartment vapor valve. It will be appreciated that since chamber A is coupled in flow communication with the cargo tank vapor recovery system in this embodiment of the invention, primary vent head 38 may be modified to function as a tank compartment vapor valve, thus eliminating the need for a separate conventional vapor valve. For example, as illustrated in FIG. 9, an embodiment of the invention incorporating the added containment volume of the cargo tank vapor recovery system may be further modified by coupling a cylinder and piston assembly, designated generally as 80, to the bottom of cylindrical tube 42 via a rocker arm assembly, designated generally as 82.

Figure 9:
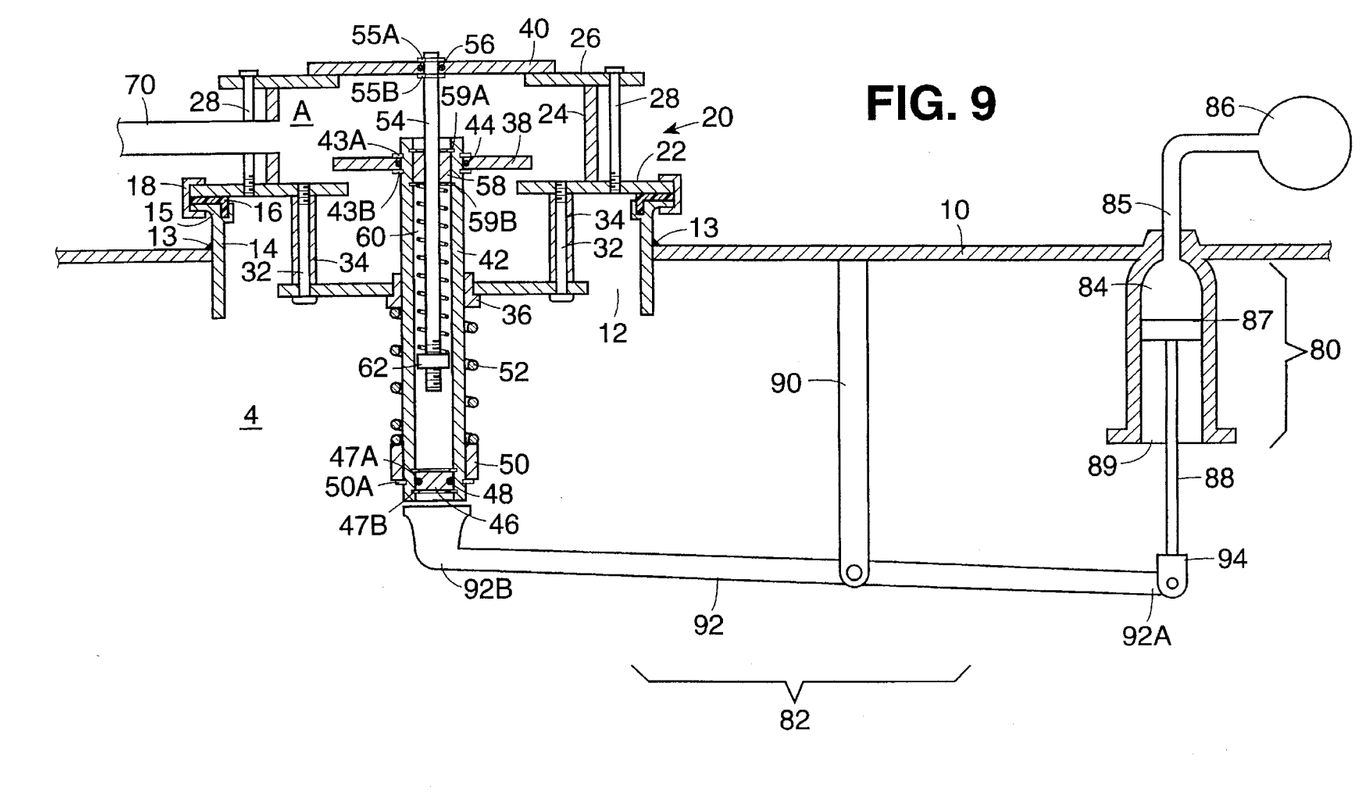
FIG. 9 is a vertical sectional view of an alternative embodiment of the present invention wherein the emergency pressure relief valve is further adapted to function as a vapor recovery valve.

Referring to FIG. 9, cylinder and piston assembly 80 consists of a conventional air-operated cylinder wherein cylinder chamber 84 has an inlet 85 coupled in flow communication with a source of compressed air 86 and a piston 87 which is slidably movable within the cylinder chamber 84. Piston 87 is further coupled to piston rod 88 which extends downward through the outlet end 89 of cylinder chamber 84 and into tank compartment 4. The rocker arm assembly 82 consists of a conventional rocker arm having a base 90 attached to the inside of top wall 10 at a position between cylinder and piston assembly 80 and tank wall opening 12. Rocker arm 92 is pivotally linked at generally its middle portion to the bottom of base 90 such that a first end 92A of rocker arm extends to a position approximately adjacent to the bottom end of piston rod 88 and a second end 92B of the rocker arm extends to a position approximately adjacent to the bottom of cylindrical tube 42.

As further shown in FIG. 9, the first end 92A of rocker arm is operatively coupled to the bottom end of piston rod 88 through a yoke and pin assembly 94. Moreover, the second end 92B of rocker arm is maintained in a normal position immediately below the bottom end of cylindrical tube 42 when primary vent head 38 is in its normally closed position. The second end 92B of rocker arm includes a flat upper surface for contacting the bottom surface of cylindrical tube 42 during operation.

According to this feature of the invention, when it is desired to operate primary vent head 38 as a tank compartment vapor valve, compressed air is injected into cylinder chamber 84 through inlet 85, thus causing piston 87 to move slidably downward within the cylinder chamber 84. The downward movement of piston 87 is transmitted to the first end 92A of rocker arm by the piston rod 88 and the yoke and pin assembly 94. This downward movement causes rocker arm 92 to pivot about base 90 thereby moving the second end 92B of rocker arm in a generally upward direction whereby it contacts and pushes the bottom end of cylindrical tube 42 upward such that primary vent head 38 opens and vapors may be vented from tank compartment 4 through chamber A and into the cargo tank vapor recovery system.

According to another feature of the present invention, the embodiment shown in FIG. 9 may be further modified such that it functions to simultaneously open the tank compartment valve 99 and the primary vent head 38 during loading or unloading of the tank compartment 4 to allow for "positive" vapor venting of the tank compartment. Positive vapor venting is desired to prevent vacuum conditions during unloading or overpressurization conditions during loading.

Figure 10:
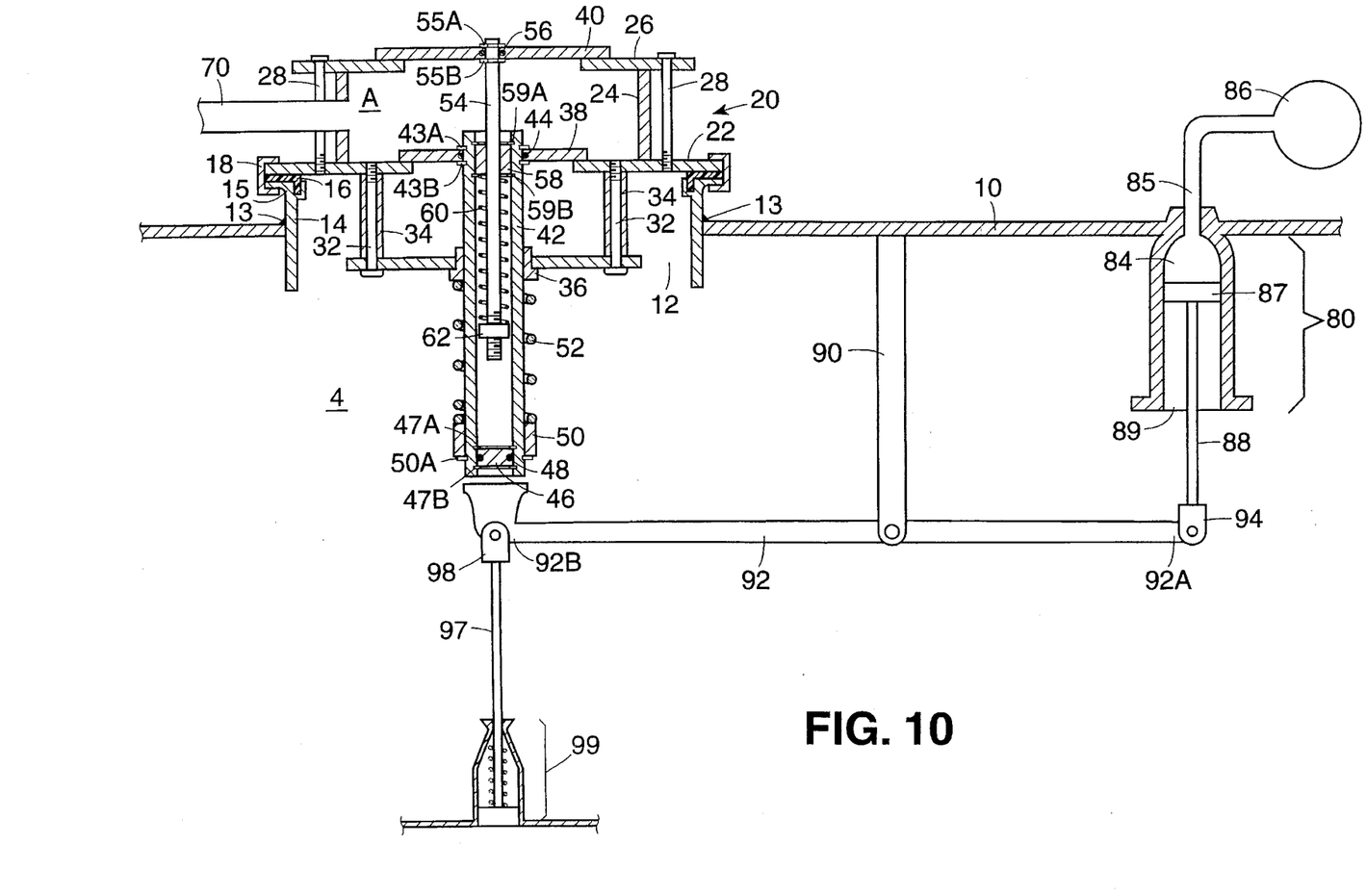
FIG. 10 is a vertical sectional view according to the alternative embodiment of FIG. 8 modified to provide positive vapor venting of the tank compartment during the loading or unloading procedures.

As shown in FIG. 10, the apparatus of FIG. 9 may be modified to include lift rod 97 which is coupled at its top end to the second end 92B of rocker arm 92 through a yoke and pin assembly 98 and at its bottom end to a conventional tank compartment valve, such as the BOMAR series 400 valve.

This embodiment of the invention operates in generally the same manner described above with respect to the embodiment illustrated in FIG. 9 except that when the second end 92B of rocker arm moves in an upward direction the lift rod 97 and the cylindrical tube 42 are forced upward whereby both tank compartment valve 99 and primary vent head 38 are unseated.

While only a few embodiments have been demonstrated and described in connection with the present invention, various modifications and changes in the apparatus will become apparent to those skilled in the art. All such modifications or changes following within the scope of the claims are intended to be included therein.

We claim:

1. A valve for relieving pressure from within a cargo tank through an opening in a cargo tank wall, which comprises:

(a) a chamber housing coupled to the cargo tank at a position centrally disposed over the tank wall opening having a flow chamber extending axially throughout and having a first opening at its lower end in flow communication with the interior of the cargo tank and a second opening at its upper end in flow communication with the exterior of the cargo tank, wherein the first opening and the second opening define a first annular valve seat and a second annular valve seat, respectively;

(b) a first vent head positioned for engagement with the first annular valve seat and movable between a normally closed position in sealing engagement with the first annular valve seat blocking flow of fluid past the first annular valve seat and an open position above the first annular valve seat enabling flow of fluid from the cargo tank past the first annular valve seat and into the flow chamber;

(c) a second vent head positioned for engagement with the second annular valve seat and movable between a normally closed position in sealing engagement with the second annular valve seat blocking flow of fluid past the second annular valve seat and an open position above the second annular valve seat enabling flow of fluid from the flow chamber to the exterior of the cargo tank;

(d) a means for yieldably biasing the first vent head toward the normally closed position to maintain a positive closure seal between the first vent head and the first annular valve seat, wherein the means provides a predetermined closing force which, when overcome by the pressure within the cargo tank, enables movement of the first vent head against the biasing force to the open position; and (e) a means for yieldably biasing the second vent head toward the normally closed position to maintain a positive closure seal between the second vent head and the second annular valve seat, wherein the means provides a predetermined closing force which, when overcome by the pressure within the flow chamber, enables movement of the second vent head against the biasing force to the open position.

2. The apparatus according to claim 1, wherein the means for yieldably biasing the first vent head comprises:

(a) an aperture centrally disposed in the first vent head;

(b) a hollow cylindrical tube having a first opening at a top end and a second opening at a bottom end, wherein the cylindrical tube is sealingly coupled at a top portion with the first vent head aperture;

(c) a shaft plug sealingly coupled to and blocking the second opening of the cylindrical tube, such that lading may not enter the cylindrical tube through its bottom end;

(d) a spring spacer coupled to the outside surface at a bottom portion of the hollow cylindrical tube;

(e) a spring mounting housing fixedly coupled inwardly of the tank compartment wall having a centrally disposed aperture through which the hollow cylindrical tube extends and is in sliding engagement therewith;

(f) a first coil spring means concentrically disposed about the bottom portion of the hollow cylindrical tube, whereby the first coil spring means is coupled at a bottom end to the spring spacer and at a top end to the spring mounting housing.

3. The apparatus according to claim 2, wherein the means for yieldably biasing the second vent head comprises:

(a) an aperture centrally disposed in the second vent head;

(c) a shaft sealingly coupled at a top portion with the second vent head aperture;

(b) a hollow cylindrical bushing fixedly secured inside the top portion of the hollow cylindrical tube through which the shaft extends and is in sliding engagement therewith;

(d) a spring seat coupled to the outside surface at a bottom portion of the shaft; and (e) a second coil spring means concentrically disposed about the shaft, whereby the second coil spring means is coupled at a bottom end to the spring seat and at a top end to the hollow cylindrical bushing.

4. The apparatus according to claim 1, wherein the chamber housing comprises:

(a) an annular valve flange centrally disposed over the tank wall opening;

(b) a hollow cylindrical tube having a first opening at its lower end and a second opening at its upper end, wherein the lower end of the hollow cylindrical tube is centrally disposed over the annular valve flange such that the first opening is in flow communication with the tank wall opening;

(c) an annular chamber plate centrally disposed over the upper end of the hollow cylindrical tube such that the second opening is in flow communication with the housing chamber; and (d) means for securing the annular chamber plate to the annular valve flange.

5. The apparatus according to claim 2, wherein the spring mounting housing comprises:

(a) an annular spring mounting plate having a centrally disposed aperture;

(b) a second hollow cylindrical bushing fixedly mounted within the annular spring mounting plate aperture, through which the hollow cylindrical tube extends and is in sliding engagement therewith; and (c) a spacer means for fixedly positioning the annular spring mounting plate at a distance below the chamber housing first annular valve seat.

6. The apparatus according to claim 2, wherein the housing chamber and the spring mounting housing comprise an integral casted unit.

7. The apparatus according to claim 1, wherein the flow chamber of the chamber housing is coupled in flow communication with a cargo tank vapor recovery system disposed on the cargo tank vehicle.

8. The apparatus according to claim 7, which further includes a pressure relief system coupled to the cargo tank vapor recovery system which vents vapor from the cargo tank vapor recovery system in order to maximize the containment volume for lading which may leak from the cargo tank during overturn of the cargo tank.

9. The apparatus according to claim 8, wherein the pressure relief system comprises:

(a) a first pressure relief valve coupled to the cargo tank vapor recovery system on one side of the cargo tank at a position generally furthest from the point at which the chamber housing is coupled in flow communication with the cargo tank vapor recovery system; and (b) a second pressure relief valve coupled to the cargo tank vapor recovery system on an opposite side of the cargo tank at a position generally furthest from the point at which the chamber housing is coupled in flow communication with the cargo tank vapor recovery system.

10. The apparatus according to claim 9, wherein the first pressure relief valve and the second pressure relief valve each comprise a separate gravity assisted pressure relief valve oriented in a normally horizontal position when the cargo tank is in an upright position.

11. The apparatus according to claim 10, wherein each gravity assisted pressure relief valve comprises:

(a) a weighted vent head positioned for engagement with the valve seat and movable between a normally closed position in sealing engagement with the valve seat and an open position apart from the valve seat for enabling flow of vapors from the cargo tank vapor recovery system to the exterior of the cargo tank; and (b) a means for yieldably biasing the weighted vent head toward the normally closed position to maintain a positive closure seal between the weighted vent head and the valve seat.

12. The apparatus according to claim 11, wherein the means for yieldably biasing the weighted vent head when the tank is in overturned state comprises:

(a) a spring force acting to close the vent head; and (b) a gravitational force of the weighted vent head acting to either open or close the vent head.

13. The apparatus according to claim 12, which further includes a shutoff device which prevents lading from being expelled from the vapor recovery system through either of the first or second pressure relief valves when the cargo tank is in an overturned state.

14. The apparatus according to claim 13, wherein the shutoff device comprises:

(a) a first floatation shutoff device associated with the first pressure relief valve; and (b) a second floatation shutoff device associated with the second pressure relief valve.

15. The apparatus according to claim 7, wherein the first vent head is operatively coupled to an opening means for permitting, when desired, movement of the first vent head from its normally closed position to an open position to enable venting of tank compartment vapors between the cargo tank compartment and the cargo tank vapor recovery system.

16. The apparatus according to claim 15, wherein the opening means is further operatively coupled to a tank compartment valve for permitting, when desired, simultaneous movement of the tank compartment valve and the first vent head from their normally closed positions to open positions in order to enable venting of tank compartment vapors between the tank compartment and the cargo tank vapor recovery system during tank compartment loading or unloading procedures.

* * * * *